Patented Dec. 15, 1942

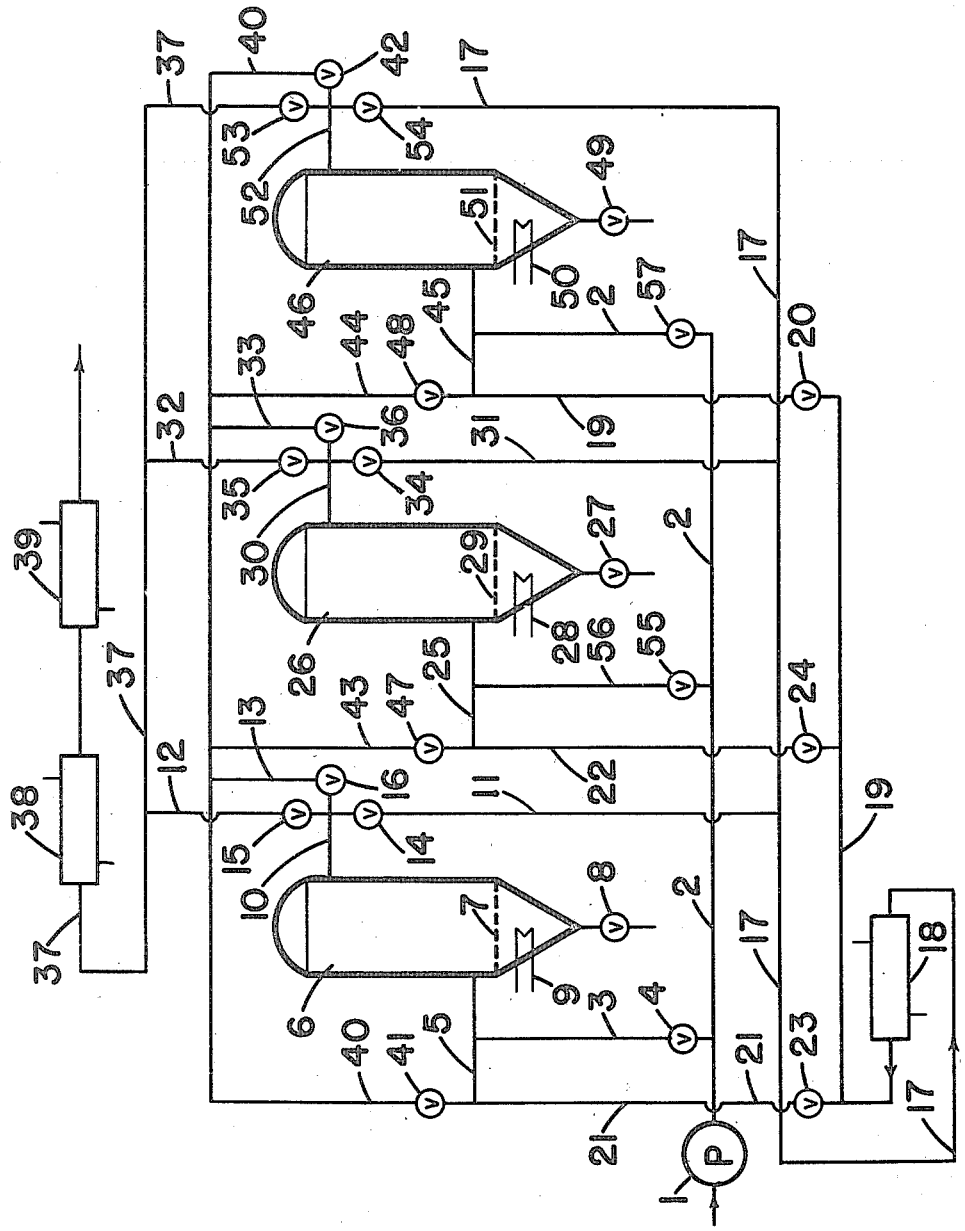

2,305,323

UNITED STATES PATENT OFFICE 2,305,323

METHOD OF CHANGING THE WATER CONTENT OF FLUIDS

Joseph J. Savelli, Baytown, Tex., assignor to Standard Oil Development Company, a corporation of Delaware Application October 4, 1939, Serial No. 297,881

5 Claims. (Cl. 196—4)

The present invention is directed to a method for drying oil and is particularly concerned with the drying of oil which is to be processed at extremely low temperatures.

In many refining processes, as well as in the production of distillate from the earth, oil is processed at temperatures well below 0° F. For example, the treatment of naphthas and kerosenes with liquid sulfur dioxide, the dewaxing of oils and some solvent extraction processes are all conducted at very low temperatures. In all these processes difficulty is encountered in the cooling of the oil to the operating temperature by reason of the freezing out of water contained in the oil with resultant plugging up of valves and heat exchangers.

Again, in many refining processes which are carried out at elevated temperatures it is of the greatest importance to have the oil as nearly dry as possible because the presence of even small amounts of water has a deleterious effect. This effect is noticed in distillation, thermal polymerization and other processes. The drying of oils for such processes is also contemplated by the present invention.

The present invention is based on the realization of the fact that most dehydrating agents exist in the form of compounds having different degrees of hydration and that these different hydrates have different vapor pressures such that by the use of a certain hydrate at a certain temperature no water will be taken up by the hydrate by reason of the fact that at that temperature its dissociation pressure is high and it tends to revert to a lower form of hydration. That is to say, instead of taking up water the hydrate gives off water to the fluid being dried. Generally speaking, the higher the hydrate, the lower the temperature at which its vapor pressure will equal the partial pressure of water in the fluid which is to be dried.

Experimental work based on the partial pressures of various hydrates of a common dehydrating agent, calcium chloride, demonstrate that the calcium chloride cannot be used as a dehydrating agent up to its final stage of hydration, even at very low temperatures, because at a temperature as low as 0° C. the hexahydrate of calcium chloride has a vapor pressure of substantially 1 mm. The oil to be dried, however, must often be dried to an extent such that at 0° C. its content of water exerts a partial pressure of less than about 0.2 mm.

Broadly speaking, therefore, the present invention resides in the control of the water content of a fluid, whether liquid or gas, to any desired percentage by contacting the fluid with an inorganic dehydrating agent possessing several hydrates in the form of that hydrate which has a vapor pressure less than the partial pressure which the desired final content of water in the fluid will exert at the selected temperature of operation. Typical dehydrating agents which may be employed are calcium chloride, sodium hydroxide, sodium sulfate and sulfuric acid.

In a more specific aspect, the present invention contemplates the use of calcium chloride for the drying of hydrocarbons in such a way as to reduce the water content of the hydrocarbons to a degree not hitherto realized and at the same time to utilize the calcium chloride to the fullest possible extent. Briefly, this objective is achieved by subjecting the hydrocarbons to be dried to a multi-stage drying operation in the first stage of which calcium chloride in one of its higher forms of hydration is employed at approximately room temperature and in later stages successively lower hydrates are employed at successively lower temperatures. In a preferred embodiment of this specific aspect of the present invention the hydrocarbons to be dried are passed over calcium chloride in a stage of hydration higher than the monohydrate at approximately room temperature and then passed over a lower hydrate of calcium chloride, not higher than the dihydrate, and preferably anhydrous calcium chloride, at a temperature below about 50° F. and preferably not higher than about 30° F.

In a particular refining operation to which the present invention has special application, naphtha which is to be extracted with liquid sulfur dioxide at a temperature of about —60° F. has in the past been passed over calcium chloride at room temperature and then been cooled down to the extraction temperature. Even when a multi-stage drying operation was applied at room temperature, the naphtha still contained sufficient water to choke up the heat exchangers and valves with ice. Prior to the present invention it has never been possible to reduce the water content of the naphtha to below .003% by volume, yielding naphtha with a cloud point of —40° F. After a few days of operation this final water content increased considerably, yielding naphtha having a cloud point of 5° F. By the practice of the present invention, however, in which the naphtha is contacted in a second stage with anhydrous calcium chloride at a temperature of about 30° F., it is possible to reduce the water content of the naphtha to .0004% at which point the naphtha has a cloud point of —70° F. Even after 20 days of operation according to this procedure the water content of the naphtha was still lower than the best that could be obtained by the previous procedure.

The present invention will be better understood from the following description of the accompanying drawing in which the single figure is a front elevation in diagrammatic form of a plant suitable for carrying out one embodiment thereof.

Referring to the drawing in detail, numeral 1 designates a charge pump which forces the naphtha to be dried into feed line 2. This line discharges through branch line 3 and valve 4, provided therein, into line 5, which, in turn, empties into tower 6. Tower 6 is covered with an insulating material of the type commonly used in refrigeration service and is provided near its bottom with a screen 7. The tower, above screen 7, is packed with calcium chloride which has been expended in a subsequent stage of the operation, but which still has not reached its final stage of hydration, that is, which has not been converted into the hexahydrate. At the bottom of tower 6 is a drawoff line provided with valve 8 for removal of calcium chloride solution. In the bottom is also a steam coil 9 which is used when required to maintain the saturated calcium chloride solution in the liquid state, it having been observed that below certain temperatures the solution tends to solidify either as the hexahydrate or in the form of a lower hydrate. The upper part of tower 6 is provided with drawoff line 10 which discharges into lines 11, 12 and 13 provided, respectively, with valves 14, 15 and 16.

With tower 6 operating at substantially room temperature with partially expended calcium chloride, valve 14 is open and valves 15 and 16 are closed, whereby the partially dried naphtha from tower 6 is discharged through lines 10 and 11 into a line 17 in which it passes into a heat exchanger 18. The temperature of the oil is reduced in this exchanger to below 50° F., preferably to about 30° F.

Connected to the outlet of exchanger 18 is a line 19, provided with a valve 20 and branch lines 21 and 22 which join line 19 at convenient points in said line between exchanger 18 and valve 20. Branch lines 21 and 22 are provided, respectively, with valves 23 and 24. With valve 24 open and valves 20 and 23 closed, the cooled naphtha passes from exchanger 18 through lines 19 and 22 into a line 25 which discharges into the lower part of a tower 26.

Tower 26 is similar in all respects to tower 6, except that it is packed with fresh anhydrous calcium chloride. Like tower 6, tower 26 is provided with a drawoff valve 27 at its bottom, a heating coil 28, a screen 29, and a discharge line 30 at its top. Line 30, in turn, joins branch lines 31, 32 and 33 which are provided, respectively, with valves 34, 35 and 36.

With valve 35 open and valves 34 and 36 closed, the dried naphtha from tower 26 discharges through lines 30 and 32 into a line 37, to which line 12 is also connected. The naphtha is then passed through successive heat exchangers 38 and 39 in which its temperature is reduced to about —60° F.

The operation so outlined is continued until one of two possible conditions is created, namely: either the calcium chloride in tower 26 does not effect the desired degree of drying or the calcium chloride in tower 6 reaches its final state of hydration. These conditions will be discussed separately.

Assuming the first condition to exist, valve 35 is closed and valve 36 is opened allowing the insufficiently-dried naphtha to discharge from line 30 through line 33 into a manifold line 40. This manifold line is provided near one end with a valve 41 ahead of a junction with line 5 and is also provided near the other end with a valve 42 just ahead of a common junction with lines 17, 37 and 52. Between valves 41 and 42, line 40 is connected to branch lines 13 and 33, and also to branch lines 43 and 44 which join, respectively, with line 25 and a line 45 which empties into tower 46 near the bottom. Branch lines 43 and 44 are provided, respectively, with valves 47 and 48.

With valves 16, 41, 42 and 47 closed and with valve 48 open, the naphtha from line 40 flows through lines 44 and 45 into tower 46. Like towers 6 and 26, tower 46 is insulated and is provided at the bottom with drawoff valve 49, steam coil 50, screen 51 and discharge line 52 which may suitably be made to empty into line 37 through a valve 53. In certain other cycles of the operation it may be desirable to cause the naphtha discharged from line 52 to empty into line 17 through valve 54 or into line 40 through valve 42 as will be subsequently explained.

In the operation now being considered, tower 46 is packed with fresh anhydrous calcium chloride and the cooled but insufficiently-dried naphtha issuing from tower 26 is caused to pass through tower 46, line 52 and into line 37. Thus the naphtha from tower 6 is caused to flow successively through exchanger 18, tower 26, tower 46 and exchangers 38 and 39. This operation can be continued until the calcium chloride in tower 6 is exhausted, thereby creating the second condition mentioned above.

When the calcium chloride in tower 6 is exhausted the naphtha to be dried is then passed from the feed source via lines 2, 56 and 25 into tower 26, which is operated at substantially room temperature, and thence through exchanger 18, tower 46, and final coolers 38 and 39. Tower 6, meanwhile, is refilled with anhydrous calcium chloride and may be brought into service for final drying by suitable manipulation of valves when tower 46 no longer accomplishes the desired drying or when the calcium chloride in tower 26 becomes exhausted.

Referring to the drawing it will be seen that feed line 2 is provided with valve 57 ahead of the junction of line 2 with line 45 which empties into tower 46. It will be evident that this valve is closed except at such time in the cycle of operation when tower 46 is operated with partially expended calcium chloride and at substantially room temperature.

Thus, the system described is capable of a continuous operation in which in the final stage the naphtha is always contacted with fresh anhydrous calcium chloride. The final stage of drying is always carried out at a temperature below about 50° F. and preferably at a temperature of about 30° F. or lower. The first stage is always carried out at room temperature and any intermediate stage is carried out at an intermediate temperature.

While only two, or on some occasions three, drying stages have been described above, it is evident that as many stages may be used as desired. It is generally not advantageous to use more than three stages when calcium chloride is used as the drying agent because calcium chloride only forms four hydrates. However, if sodium hydroxide were used as the drying agent it might be desirable to use more stages since sodium hydroxide forms nine different hydrates.

While the preferred method of carrying out the invention is to remove water from a non-aqueous fluid, it is also possible to add water to a non-aqueous fluid. Under some circumstances it may be desirable to add water to a fluid at a slow and controlled rate. When this is desired the dry non-aqueous fluid may be allowed to come in contact with a less hydrated salt at a low temperature as the first step and then allowed to come in contact with a more hydrated salt at a higher temperature as a subsequent step. This procedure may, of course, be carried out in as many steps as is considered desirable.

The nature and objects of the present invention having been thus described and illustrated, what is claimed as new and useful and is desired to be secured by Letters Patent is:

1. A method for reducing the water content of a predominantly non-aqueous fluid which comprises contacting the fluid with a selected hydrate of a dehydrating agent possessing several degrees of hydration first at room temperature and then with a second hydrate of the same dehydrating agent in a different degree of hydration at a temperature at which said second hydrate has a vapor pressure less than the partial pressure exerted by the desired final water content of the fluid at said second temperature of operation.

2. A method of drying a hydrocarbon fluid which comprises contacting the fluid at substantially room temperature with a partially hydrated calcium chloride and then contacting the fluid at a lower temperature with a less hydrated calcium chloride.

3. A method for reducing the water content of a hydrocarbon fluid which comprises the steps of contacting the fluid at substantially room temperature with a partially hydrated calcium chloride and subsequently contacting the fluid at a temperature of approximately the freezing point of water with a less hydrated calcium chloride.

4. A method for reducing the water content of a hydrocarbon fluid which comprises contacting the fluid at substantially room temperature with a partially hydrated salt, chilling the fluid to approximately 30° F., contacting it with a less hydrated salt and then contacting it with substantially anhydrous salt.

5. A method in accordance with the preceding claim in which the salt is calcium chloride.

JOSEPH J. SAVELLI.